US008542130B2

(12) United States Patent
Lavoie

(10) Patent No.: US 8,542,130 B2
(45) Date of Patent: Sep. 24, 2013

(54) INTEGRATION OF GLOBAL POSITIONING SYSTEM AND ACTIVE PARKING ASSIST FUNCTIONALITIES

(75) Inventor: Erick Michael Lavoie, Dearborn, MI (US)

(73) Assignee: Ford Global Technologies, Dearborn, MI (US)

( * ) Notice: Subject to any disclaimer, the term of this patent is extended or adjusted under 35 U.S.C. 154(b) by 160 days.

(21) Appl. No.: 13/080,851

(22) Filed: Apr. 6, 2011

(65) Prior Publication Data

US 2012/0256766 A1     Oct. 11, 2012

(51) Int. Cl.
*G08G 1/14*     (2006.01)

(52) U.S. Cl.
USPC .......... 340/932.2; 340/436; 701/41; 280/761; 180/199

(58) Field of Classification Search
USPC ............... 340/932.2, 436, 425.5, 437; 701/1, 701/41, 42; 180/199; 280/761
See application file for complete search history.

(56) References Cited

U.S. PATENT DOCUMENTS

| | | | |
|---|---|---|---|
| 6,683,539 B2 * | 1/2004 | Trajkovic et al. .......... | 340/932.2 |
| 6,820,711 B2 * | 11/2004 | Yamada et al. .............. | 180/204 |
| 6,898,527 B2 | 5/2005 | Kimura et al. | |
| 7,598,887 B2 | 10/2009 | Sato et al. | |
| 2003/0004613 A1 * | 1/2003 | Hahn et al. ........................ | 701/1 |
| 2003/0122687 A1 * | 7/2003 | Trajkovic et al. .......... | 340/932.2 |
| 2006/0235590 A1 * | 10/2006 | Bolourchi et al. .............. | 701/41 |
| 2008/0154464 A1 * | 6/2008 | Sasajima et al. ................ | 701/42 |
| 2009/0178876 A1 | 7/2009 | Miki et al. | |
| 2009/0289813 A1 | 11/2009 | Kwiecinski et al. | |

OTHER PUBLICATIONS

Global positioning system-based vehicle contol for automated parking rivers' perception of secondary braking systems *Source: Proceedings of the Institution of Mechanical Engineers, Part D: Journal of Automobile Engineering*, v 220, n 1, p. 37-52, 2006; Author: Zhu, C.1; Rajamani, R.
Sciencestage.com *Topic: Group—Intelligent Parking Assist system*; Source: http://sciencestage.com/g/1005609/intelligent-parking-assist-system.html.

\* cited by examiner

*Primary Examiner* — George Bugg
*Assistant Examiner* — Edny Labbees
(74) *Attorney, Agent, or Firm* — Angela M. Brunetti; Raymond Coppielle

(57) ABSTRACT

A vehicle has a global positioning system and an active parking assist system. The global positioning system is configured for providing information designating a present location of the vehicle and for providing information designating configuration of a target parking location proximate to the present location of the vehicle. The active parking assist system is configured to affect maneuvering of the vehicle into the target parking location. The active parking assist system is coupled to the global positioning system for acquiring the present location information therefrom and the target parking location information therefrom. The active parking assist system determines a type of assisted parking functionality to implement for affect maneuvering of the vehicle into the target parking location dependent upon the present location information and the target parking location information.

16 Claims, 2 Drawing Sheets

INTEGRATION OF GLOBAL POSITIONING SYSTEM AND ACTIVE PARKING ASSIST FUNCTIONALITIES

FIELD OF THE DISCLOSURE

The disclosures made herein relate generally to parking assist implementations in vehicles and, more particularly, to approaches for integrating global position system (GPS) functionality with active parking assist (APA) functionality.

BACKGROUND

Parking a vehicle correctly can be a difficult challenge for certain drivers. In some instances, such parking requires maneuvering a vehicle to park it between two other vehicles that are parked in an end-to-end manner (e.g., cars that are parallel parked along a curb), which is commonly referred to as parallel parking. In other instances, such parking requires maneuvering a vehicle to park it between two other vehicles that are parked in a side-by-side manner (e.g., cars that are in a typical parking lot), which is commonly referred to as perpendicular parking. Factors that can contribute to and/or complicate such parking maneuvers include, but are not limited to, the size of the car being parked, the mobility of the vehicle being parked (e.g., turning radius), the spaced between the parked cars, a driver's inherent skill at performing such parking maneuvers, and the like.

Vehicles equipped with an active parking assist (APA) system can assist drivers in overcoming some challenges associated with performing parallel and/or perpendicular parking. However, the human machine interface (HMI) of a typical APA system can be complex for some drivers. Furthermore, the HMI can exhibit additional complexity when the APA system includes automatic perpendicular parking and pull-out assist (APPPA) functionality. For example, certain APA systems with APPPA functionality can require the driver to press a button in order available parallel and/or perpendicular parking spaces to be offered. Similarly, additional user input can be will be required to indicate to the APA system whether or not perpendicular or parallel assisted parking functionality is desired by the customer. Furthermore, it is known that APA systems can offer parking assist functionality for a parking space that is not valid to park (e.g., an curb-side space adjacent to a fire hydrant, an open space at the end of a row of parallel parked cars, etc).

Thus, configuring a vehicle in a manner that utilizes GPS functionality for enhancing functionality of an active parking assist system of the vehicle is desirable.

SUMMARY OF THE DISCLOSURE

Embodiments of the present invention relate to configuring a vehicle in a manner that utilizes GPS functionality for enhancing functionality of an active parking assist system of the vehicle. One such enhancement relates to actively assisting a driver in selecting between assisted parking functionality for parallel parking and assisted parking functionality for perpendicular parking. Another such enhancement relates to aiding a driver in confirming that a target parking location is in fact a valid/legal location in which to park. In this manner, embodiments of the present invention advantageously overcome one or more shortcomings associated with conventional approaches to implementing active parking assist functionality.

In one embodiment of the present invention, a vehicle comprises a global positioning system and an active parking assist system. The global positioning system is configured for providing information designating a present location of the vehicle and for providing information designating configuration of a target parking location proximate to the present location of the vehicle. The active parking assist system is configured to affect maneuvering of the vehicle into the target parking location. The active parking assist system is coupled to the global positioning system for acquiring the present location information therefrom and the target parking location information therefrom. The active parking assist system determines a type of assisted parking functionality to implement for affect maneuvering of the vehicle into the target parking location dependent upon the present location information and the target parking location information.

In another embodiment of the present invention, a parking assist system for a vehicle comprises a signal interface and an information processing module. The signal interface is configured for receiving information designating a present location of a vehicle and for receiving information designating a configuration of a target parking location proximate to the present location of the vehicle. The information processing module is configured for activating a type of assisted parking functionality dependent upon the present location information and the target parking location information.

In another embodiment of the present invention, a processor-readable medium has tangibly embodied thereon and accessible therefrom a set of instructions interpretable by at least one data processing device. The instructions are provided in a manner whereby the processor-readable medium is non-transient with respect to storage and access of the instructions therefrom. The set of instructions is configured for causing the at least one data processing device to carry out operations for A processor-readable medium having tangibly embodied thereon and accessible therefrom a set of instructions interpretable by at least one data processing device, the processor-readable medium being non-transient, the set of instructions configured for causing the at least one data processing device to carry out operations for acquiring information designating a present location of a vehicle and information designating a configuration of a target parking location proximate to the present location of the vehicle and for determining a type of assisted parking functionality to implement for affecting maneuvering of the vehicle into the target parking location. Determining the type of assisted parking functionality to implement is performed using the present location information and the target parking location information.

These and other objects, embodiments, advantages and/or distinctions of the present invention will become readily apparent upon further review of the following specification, associated drawings and appended claims.

DETAILED DESCRIPTION OF THE DRAWING FIGURES

By leveraging the positioning capability of a global positioning system (GPS), embodiments of the present invention can reduce the amount of driver input required to an active parking assist system and reduce unnecessary/incorrect information provided to the driver by the global positioning system. Advantageously, such GPS information can be used to automatically activate a proper mode of operation of an active parking assist (APA) system for a target parking location. For example, if a vehicle configured in accordance with the present invention enters/approaches a parking lot or garage (i.e., a parking location) where there are predominantly perpendicular parking spaces (i.e., a perpendicular parking configuration) as determined by the GPS system, the APA system can automatically become active in a perpendicular parking mode. Similarly, if such vehicle enters/approaches a parking lot or garage (i.e., a parking location) where there are predominantly parallel parking spaces (i.e., a parallel parking configuration) as determined by the GPS system, the APA system can automatically become active in a parallel parking mode. In another mariner, as such vehicle is driven through a region where there are parking locations of various configuration (e.g., parallel parking configuration, perpendicular parking configuration) and/or invalid parking locations (e.g., private parking structures, parking structures not available at a present time, parking spaces that are not available for use, etc), as the vehicle gets within a defined proximity to such parking location(s), the APA system can become active and toggle between parallel and perpendicular parking modes automatically, as appropriate. Furthermore, the APA system can automatically omit or deselect parking locations that are not valid. Still further, a ACA system configured in accordance with the present invention can be configured for learning where an associated vehicle is typically parked and the type of parking configuration at that location to offer such automatic active parking location searching and mode selection. It is disclosed herein that a target parking location within the context of the present invention can be a discrete parking space into which a vehicle is parked and/or can be a parking structure (e.g., parking garage, parking lots, etc) that includes a plurality of discrete parking spaces.

Figure 1:
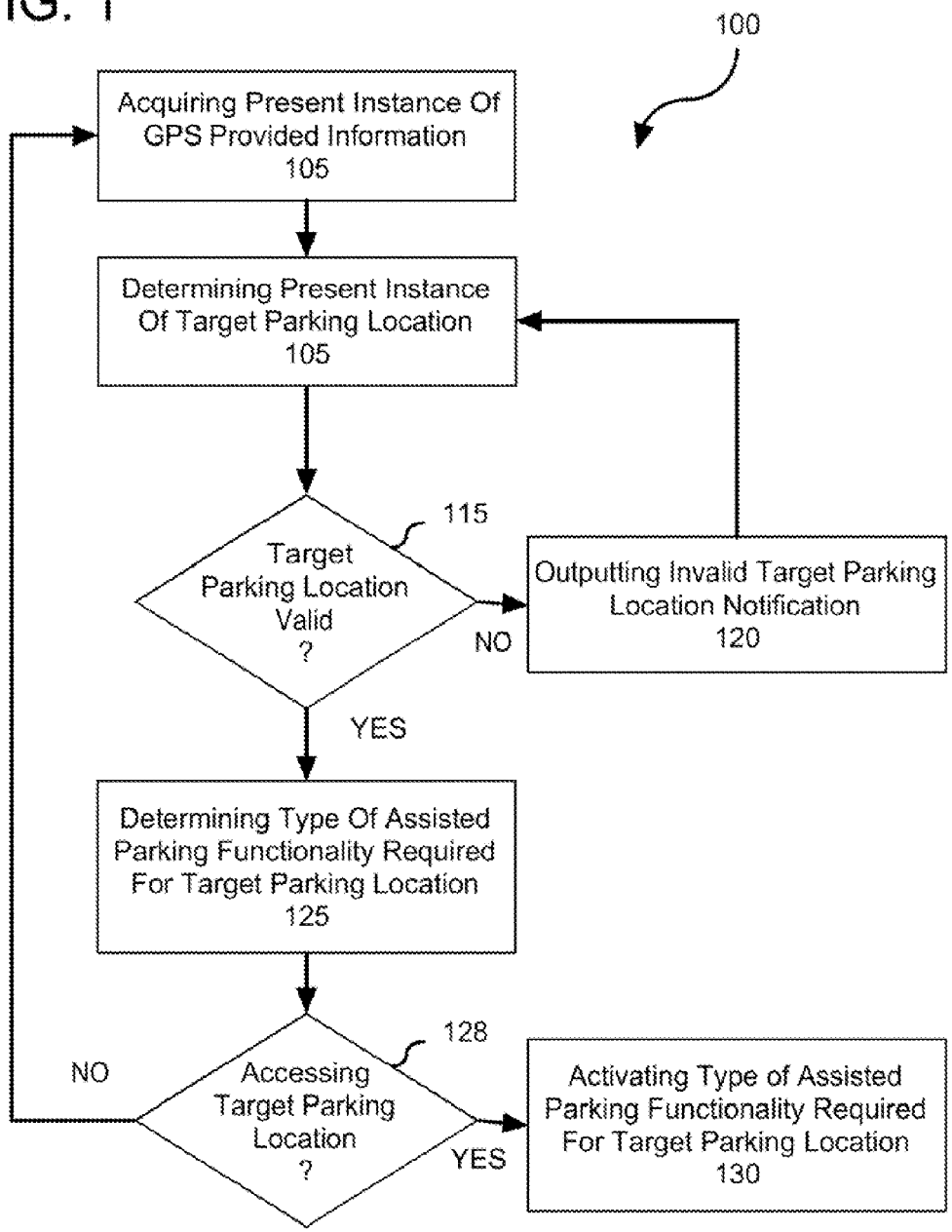
FIG. 1 is a flow chart view showing a method for implementing GPS-enhanced active parking assist functionality in accordance with an embodiment of the present invention.

Referring now to FIG. 1, a method 100 for implementing GPS-enhanced active parking assist functionality in accordance with an embodiment of the present invention is shown. An operation 105 is performed for acquiring a present instance of GPS provided information. The GPS information can include information designating a present location of the vehicle, a configuration of a target parking location proximate to the present location of the vehicle, information indicating whether a particular parking location is available for parking, and information for leading the vehicle along a particular desired route. Such acquiring can include sampling of a signal provided at a signal interface of a global positioning system, thereby producing a present instance of GPS provided information.

In response to acquiring the GPS-provided information, an operation 110 is performed for determining a target parking location. In one embodiment, the target parking location is a parking location that is of a specified (e.g., closest) proximity to the vehicle with respect to at least one other available parking location. In another embodiment, the target parking location is a parking location that is of a specified (e.g., closest) proximity to an intended destination of the vehicle as defined by the present instance of GPS provided information.

After determining the target parking location, an operation 115 is performed for determining if the target parking location is a valid. A valid parking location can be defined herein to be a parking location that meets a prescribed set of criteria for the vehicle (registered for a particular parking location, proper type of vehicle for a certain parking location, etc), for a driver of the vehicle (e.g., personnel authorized to park at a certain parking location), and the like. In general, a valid parking location is one in which parking of the vehicle will not violate any law(s), contract(s), ordinance(s) or other express or implied obligation(s) associated with the vehicle and/or driver.

If it is determined that the target parking location is not a valid parking location, the method 100 can continue at an operation 120 for outputting an invalid target parking location notification (e.g., an audible message, a visual message, etc), followed by the method 100 continuing at the operation 110 for determining another instance of a target parking location. Such determination of another instance may require the method to acquire a new instance of GPS provided information (e.g., the method proceeding at the operation 105 as opposed to the operation 110). The underlying intent of such message is to warn that driver of the vehicle that parking in a certain parking location (i.e., the previously determined target parking location) is not advised and/or may result in fines, penalties, towing and the like.

If it is determined at the operation 115 that the target parking location is a valid parking location, an operation 125 is performed for determining a type of assisted parking functionality required for the target parking location. In a preferred embodiment, determining the type of assisted parking functionality will include determining if the target parking location is a parking location having a parallel parking configuration or a parking location having a perpendicular parking configuration.

Thereafter, an operation 128 is performed for determining relative movement of the vehicle with respect to the target parking location. If it is determined that the vehicle is not being maneuvered in a manner to access the target parking location (e.g., moving past the target parking location, turning away from the target parking location, etc), the method 100 can continue at the operation 110 for determining another instance of a target parking location under the assumption that the driver of the vehicle does not wish to park in the present instance of the target parking location. If it is determined that the vehicle is being/may be maneuvered in a manner to access the target parking location, an operation 130 is performed for activating the type of assisted parking functionality required for the target parking location. In this regard activation of the assisted parking functionality may toggle between parallel parking functionality and perpendicular parking functionality depending on movement of the vehicle.

Figure 2:
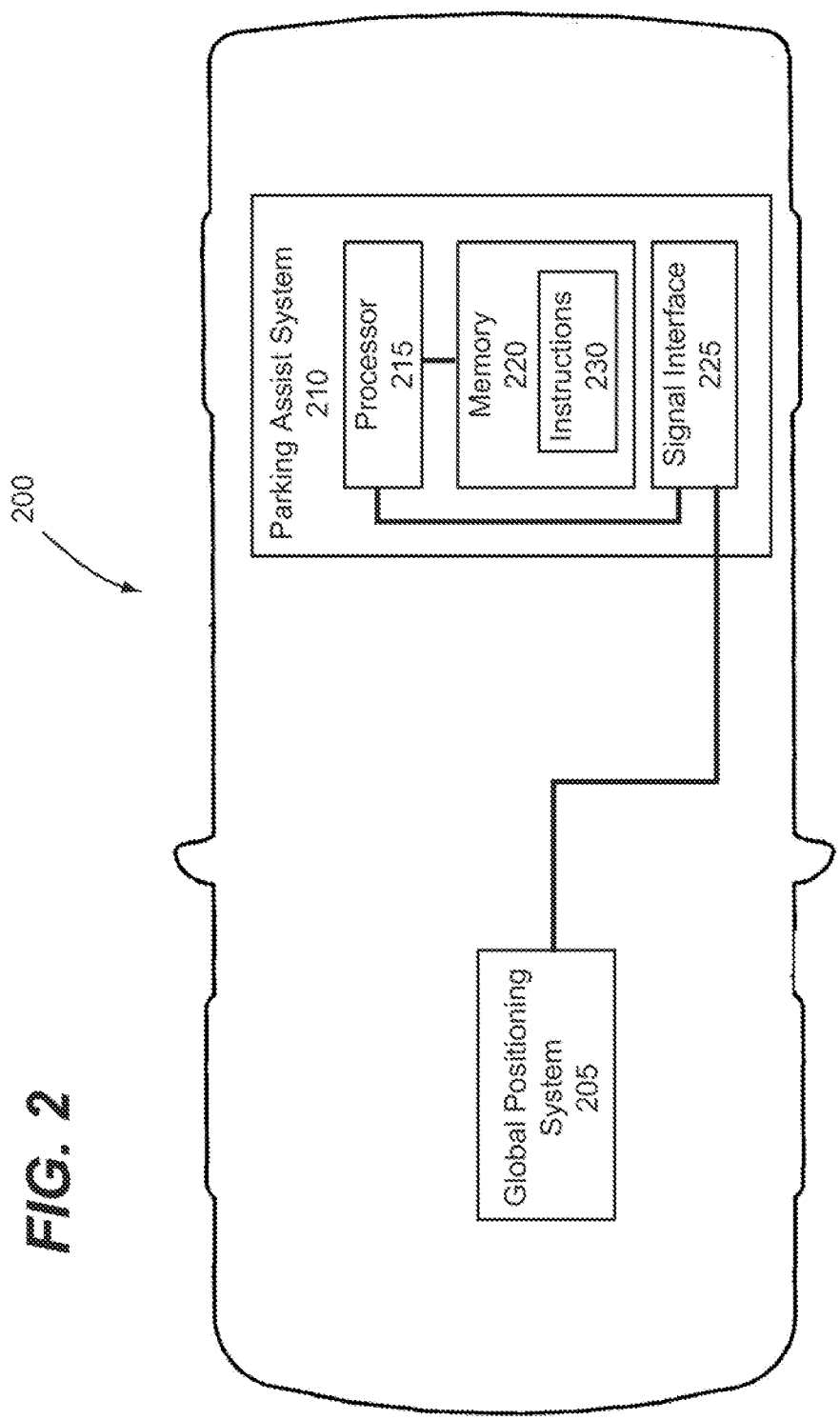
FIG. 2 is a block diagram view of a vehicle configured for implementing GPS-enhanced active parking assist functionality in accordance with an embodiment of the present invention is shown

Turning now to FIG. 2, a vehicle 200 configured for implementing GPS-enhanced active parking assist functionality in accordance with an embodiment of the present invention is shown. The vehicle 200 includes a global positioning system 205 and a parking assist system (PAS) 210. The global positioning system is coupled to the PAS 210 for allowing communication of information therebetween (e.g., one-way transmission of information, two-way transmission of information, etc).

The global positioning system 205 is configured for receiving, processing, and outputting information associated with a present position of the vehicle 200. It is well-known the manner in which a global positioning system receives, processes, and outputs such information. In the context of the present invention, examples of such information includes, but is not limited to, information designating a present location of the vehicle 200, information designating a configuration of a target parking location proximate to the present location of the vehicle 200, information indicating whether a particular parking location is available for parking, and information for leading the vehicle 200 along a particular desired route. It is disclosed herein that the global positioning system 205 can be a commercially-available global positioning system that is a standalone unit mountable within the vehicle 200, a global positioning system that is an original equipment accessory or standard feature of the vehicle 200, or a global positioning system that is an aftermarket accessory item that has been installed in the vehicle 200. In this regard, the global positioning system 205 can access necessary information (e.g., information designating a present location of the vehicle 200, information designating a configuration of a target parking location proximate to the present location of the vehicle 200, information indicating whether a particular parking location is available for parking, information for leading the vehicle 200 along a particular desired route, etc) from one or more sources. Examples of such sources include, but are not limited to, a database stored on the vehicle 200, a database stored on a portable device that is accessible by the global positioning system 205 (e.g., via a USB interface or Bluetooth interface), a database stored on a remote server and (e.g., via a wireless data connection), and the like. Embodiments of the present invention are not unnecessarily limited to any particular type or configuration of global positioning system.

The PAS 210 includes a processor 215, memory 220, a signal interface 225, and instructions 230. The signal interface 225 is coupled between the processor 215 and the global positioning system, thereby allowing information accessible from the global positioning system 205 (e.g., present location information therefrom and target parking location information) to be provided to the PAS 210. The memory 220 is coupled to the processor 215 for allowing the instructions 230 to be accessed from the memory 220 by the processor 215. The memory 220 and instructions 230 jointly define an example of a non-transient processor-readable medium. The processor, the memory 220 and the instructions 230 are an example of an information processing module configured for determining and/or activating a particular type of assisted parking functionality dependent upon present location information and/or target parking location information.

The instructions 230 are configured for carrying out parking assist functionality in accordance with embodiments of the present invention. To this end, the instructions 230 are configured for determining and/or activating a particular type of assisted parking functionality dependent upon present location information and/or target parking location information. In one embodiment, the instructions 230 are configured for carrying out the method 100 above for implementing GPS-enhanced active parking assist functionality.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A system to assist parking a vehicle, comprising:
a global positioning system configured for providing information designating a present location of the vehicle and for providing information designating a configuration of a target parking location proximate to the present location of the vehicle;
an active parking assist system configured to affect maneuvering of the vehicle into the target parking location, wherein the active parking assist system is coupled to the global positioning system for acquiring the present location information therefrom and the target parking location information therefrom and wherein the active parking assist system determines a type of assisted parking functionality to implement for affect maneuvering of the vehicle into the target parking location dependent upon the present location information and the configuration of the target parking location information;
the active parking assist system uses the present location information for determining that the target parking location is of closest proximity to the vehicle with respect to at least one other available parking location;
the active parking assist system activates a particular one of a plurality of modes of operation dependent upon the configuration of the target parking location information;
the active parking assist system uses the configuration of the target parking location information for determining that the target parking location is a valid parking location dependent upon parking validity information applicable to a present instance of assisted parking functionality by the active parking assist system; and
the active parking assist system automatically omits parking locations that are not valid, provides a notification that a parking location is invalid and determines another instance of a target parking location.

2. The system of claim wherein the active parking assist system makes the determination to implement:
a parallel parking mode of operation in response to the target parking location information indicating that the configuration of the target parking location has a parallel parking configuration; and
a perpendicular parking mode of operation in response to the target parking location information indicating that the configuration of the target parking location has a perpendicular parking configuration.

3. The system of claim 1 wherein the configuration of the target parking location information designates that the target parking location is one of a parking location having a parallel parking configuration and a parking location having a perpendicular parking configuration.

4. The system of claim 1 wherein the active parking assist system determines that the configuration of the target parking location is one of a parking location having a parallel parking configuration and a parking location having a perpendicular parking configuration dependent upon the target parking location information.

5. The system of claim 1 wherein the active parking assist system determines that the configuration of the target parking location is one of a parking location having a parallel parking configuration and a parking location having a perpendicular parking configuration dependent upon the target parking location information.

6. The system of claim 1 wherein the active parking assist system uses the configuration of the target parking location information for determining that the target parking location is a valid parking location dependent upon parking validity information applicable to a present instance of assisted parking functionality by the active parking assist system.

7. A parking assist system for a vehicle, comprising:
a signal interface for receiving information designating a present location of a vehicle and for receiving information designating a configuration of a target parking location proximate to the present location of the vehicle;
an information processing module configured for activating a type of assisted parking functionality dependent upon the present location information and the configuration of the target parking location information, using the target parking location information for determining that the target parking location is a valid parking location dependent upon parking validity information applicable to a present instance of assisted parking functionality by the active parking assist system, automatically omitting parking locations that are not valid, providing a notification that a parking location is invalid, and determining another instance of a target parking location.

8. The parking assist system of claim 7 wherein activating the type of assisted parking functionality includes determining if the target parking location is a parking location having a parallel parking configuration or a parking location having a perpendicular parking configuration.

9. The parking assist system of claim 7 wherein activating the type of assisted parking functionality includes:
activating a parallel parking mode of operation in response to the configuration of the target parking location being a parking location having a parallel parking configuration; and
activating a perpendicular parking mode of operation in response to the configuration of the target parking location being a parking location having a perpendicular parking configuration.

10. The parking assist system of claim 7 wherein the information processing module is further configured for:
using the present location information for determining that the target parking location is of closest proximity to the vehicle with respect to at least one other available parking location; and
automatically activating a particular one of a plurality of modes of operation dependent upon the configuration of the target parking location information.

11. The parking assist system of claim 7 wherein the target parking location information designates that the configuration of the target parking location is one of a parking location having a parallel parking configuration and a parking location having a perpendicular parking configuration.

12. A controller having a set of instructions to carry out operations for:
acquiring information designating a present location of a vehicle and information designating a configuration of a target parking location proximate to the present location of the vehicle;
determining a type of assisted parking functionality to implement for affecting maneuvering of the vehicle into the target parking location, wherein determining the type of assisted parking functionality to implement is performed using the present location information and the configuration of the target parking location information
using the configuration of the target parking location information for determining that the target parking location is a valid parking location dependent upon parking validity information applicable to a present instance of assisted parking functionality by the active parking assist system;
providing a notification that a target parking location is invalid and determining another instance of a target parking location.

13. The controller of claim 12 wherein determining the type of assisted parking functionality to implement includes determining if the target parking location is a parking location having a parallel parking configuration or a parking location having a perpendicular parking configuration.

14. The controller of claim 12 wherein the set of instructions are further configured for causing the at least one data processing device to carry out operations for:
activating a parallel parking mode of operation is required in response to determining that the configuration of the target parking location is a parking location having a parallel parking configuration; and
activating a perpendicular parking mode of operation in response determining that the configuration of the target parking location is a parking location having a perpendicular parking configuration.

15. The controller of claim 12 wherein the set of instructions are further configured for causing the at least one data processing device to carry out operations for:
using the present location information for determining that the target parking, location is of closest proximity to the vehicle with respect to at least one other available parking location; and
automatically activating a particular one of as plurality of modes of operation dependent upon the configuration of the target parking location information.

16. The controller of claim 12 wherein the target parking location information designates that the target parking location is one of a parking location having a parallel parking configuration and a parking location having a perpendicular parking configuration.

* * * * *